Oct. 16, 1923.
C. S. STONE
ADJUSTABLE MAGNIFIER
Filed Oct. 8, 1921
1,470,890
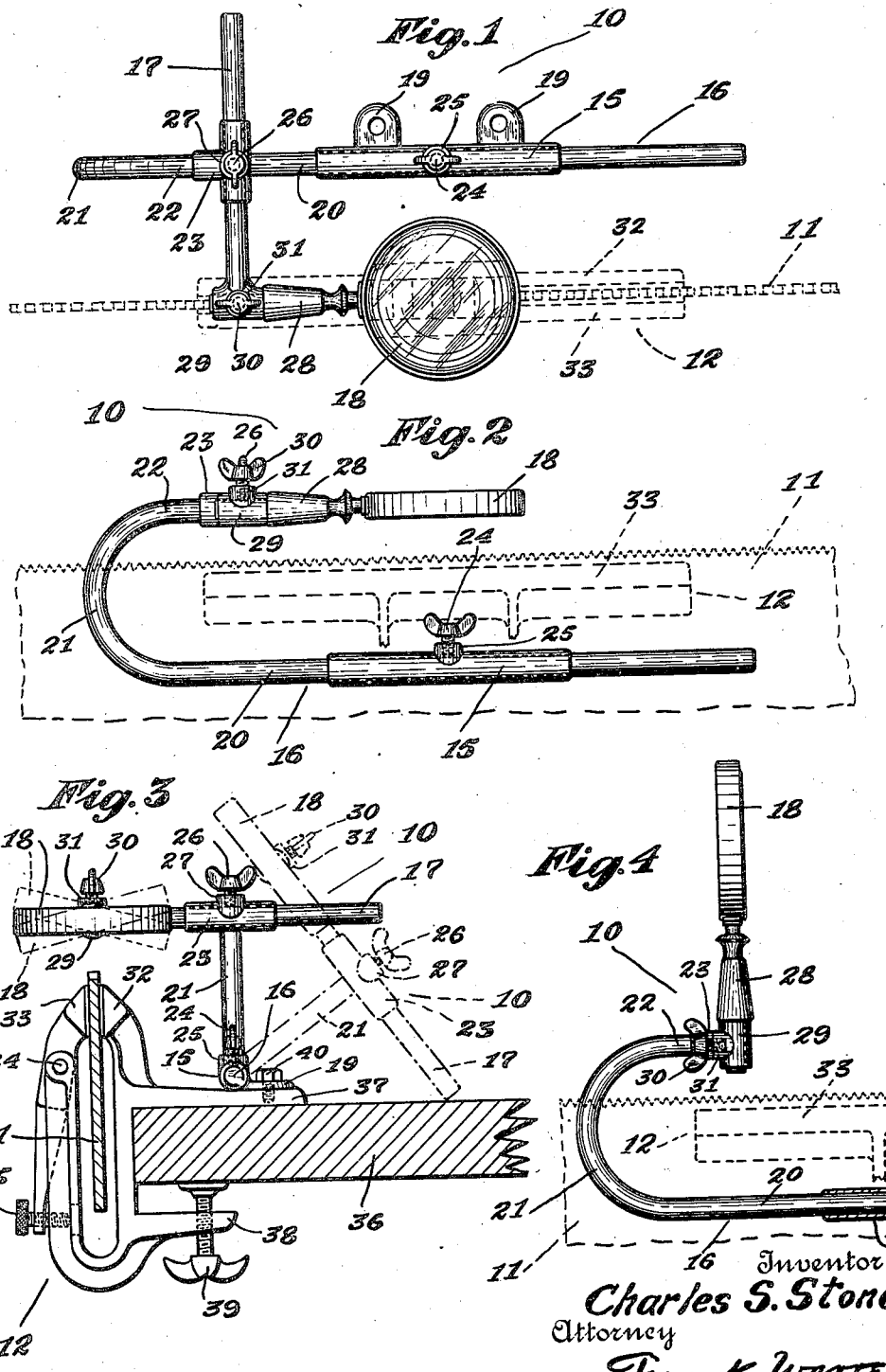

Patented Oct. 16, 1923.

1,470,890

UNITED STATES PATENT OFFICE.

CHARLES S. STONE, OF BREMERTON, WASHINGTON, ASSIGNOR OF ONE-HALF TO ANNIE GRASSIER, OF SEATTLE, WASHINGTON.

ADJUSTABLE MAGNIFIER.

Application filed October 8, 1921. Serial No. 506,509.

*To all whom it may concern:*

Be it known that I, CHARLES S. STONE, a citizen of the United States, residing at Bremerton, in the county of Kitsap and State of Washington, have invented a certain new and useful Improvement in Adjustable Magnifiers, of which the following is a specification.

My invention relates to improvements in adjustable magnifiers and the object of my invention is to provide an adjustable magnifier adapted for use with saw filing devices, whereby the teeth of the saw to be filed are magnified or enlarged, thus relieving or minimizing the eye strain ordinarily suffered by the saw filer.

Another object is to provide an adjustable magnifier adapted for use with and to be attached to any of the well known types of saw clamps.

A further object is to provide an adjustable magnifier embodying novel means adapted to permit the longitudinal and radial adjustment of the magnifying element of said magnifier with respect to the base or support thereof, as well as the saw to be worked upon.

A still further object is to provide an adjustable magnifier embodying novel means adapted to permit of the lateral adjustment of the magnifying element of said magnifier with respect to the base thereof, to thereby align or centralize said element with respect to the teeth of the saw to be worked upon, as well as to permit of said magnifying element being swung upwardly away from said teeth or cutting edge of said saw to a vertical inoperative position, to thus permit of the ready removal, replacement or adjustment of said saw within its associated clamp.

A still further object is to provide an adjustable magnifier embodying novel means adapted to permit of the angular adjustment of the magnifying element of said magnifier with respect to a normal horizontal plane or the plane of the teeth of the saw to be worked upon.

A still further object is to provide an adjustable magnifier embodying simplicity, durability and economy in construction that is positive and efficient in operation, that is neat and ornamental in appearance and that will not readily get out of order.

With the above and other objects in view which will appear as the description proceeds, my invention resides in the novel construction, combination, adaptation and arrangement of parts hereinafter described and claimed.

I accomplish these objects by devices illustrated in the accompanying drawings, wherein—

Figure 1 is a top plan view of an adjustable magnifier embodying the features and principles of my invention and illustrating the same in its relative operative position with respect to the saw to be filed, which saw with a fragmentary portion of its associated clamp is shown in dotted lines;

Fig. 2 is a view in side elevation of the same in a similar operative position;

Fig. 3 is a view in end elevation of my adjustable magnifier as it would appear when operatively secured to a saw clamp of any well known form and illustrating the same in an adjusted radial position with respect to its base member in dot and dash lines, also illustrating the magnifying element in several adjusted angular positions with respect to a horizontal plane in dotted and dash lines; and Fig. 4 is a fragmentary view in side elevation of my device illustrating the magnifying element in an inoperative or radially adjusted vertical position with respect to its associated longitudinally adjustable member, parts being shown in section.

Referring to the drawings, throughout which like reference numerals designate like parts, the numeral 10 designates my adjustable magnifier, 11 designates the saw to be worked upon and 12 the clamps to operatively secure the saw in a well known manner during the filing operation.

My adjustable magnifier 10 comprises a base or anchoring member 15, a longitudinally and radially adjustable supporting member 16, a laterally and radially adjustable member 17 and the angularly adjustable magnifying glass or element 18.

The base or anchoring member 15 is formed substantially in the tubular shape shown and is provided upon one side thereof with outwardly projecting spaced and perforated lugs 19 which serve to secure or anchor said member in any suitable or selected position.

The longitudinally and radially adjustable supporting member 16 comprises a lower horizontally disposed portion or leg 20, an upwardly curved semi-circular portion 21, and an upper horizontally disposed portion 22.

The lower horizontally disposed portion 20 is adapted to be concentrically disposed for longitudinal and circumferential or radial adjustment within the base member 15, said portion 20 being curved or bent upwardly at one end thereof to form the substantially semi-circular curved portion 21 and the upper horizontally disposed portion 22, which portion 22 is superposed in spaced parallel relation with respect to the lower horizontally disposed portion 20.

The upper horizontally disposed portion 22 is of relatively short length in comparison to the length of the portion 20 and is adapted to terminate in a tubular T member 23, which T member is adapted to be secured upon the terminal or end of the portion 22 in any well known manner.

The longitudinally and radially adjustable member 16 is adapted to be normally secured against longitudinal or radial movement within the base member 15 by a clamping thumb screw 24, which thumb screw is adapted to be threadably engaged within a boss 25 formed upon the periphery of said member 15 substantially midway of the length thereof.

The laterally and radially adjustable member 17 is adapted to be concentrically disposed for longitudinal and radial adjustment within the T member 23, said member 17 being normally disposed in perpendicular relation with respect to the portion 22 of the member 16, as shown more clearly in Fig. 1.

The member 17 is adapted to be normally clamped in any selected or desired adjusted position within the T member 23 by a clamping thumb screw 26, which thumb screw is adapted to be threadably engaged within a boss 27 formed upon said T member 23 at the juncture of the branch portions thereof.

The angularly adjustable magnifying glass or element 18 may be of any well known type or form and is provided with a handle 28, which handle is adapted to be concentrically disposed at its outer end for radial or circumferential adjustment within a perpendicularly disposed tubular portion 29 formed integrally upon the forward end of the member 17, said radial or circumferential adjustment of the handle 28 within the portion 29 permitting of the angular adjustment of said magnifying glass with respect to a normal horizontal plane or the normal plane of the saw to be worked upon, as will be readily apparent and obvious by referring to the several views of the drawings.

The outer end of the handle 28 is adapted to be normally clamped in any selected and desired adjusted position within the portion 29 by a clamping thumb screw 30, which thumb screw is adapted to be threadably engaged within a boss 31 formed upon said portion midway of the length thereof.

In Fig. 3 I have illustrated the saw clamp 12 in full lines which clamp may be of any well known or desired form and is adapted to clamp or secure the saw 11 in operative position therein in a well known manner.

The saw clamp 12 comprises complemental saw clamping jaws 32 and 33 respectively, said jaw 33 being pivotally secured or mounted, as at 34, upon the jaw 32.

The jaw 33 is also adapted to be adjusted to and from its associated jaw 32, as by an adjusting screw 35.

To fixedly secure or clamp the saw clamp 12 in an operative position upon a work bench, as 36, I have provided the rear side of the saw clamping jaw 32 of said clamp with rearwardly extending upper and lower spaced parallel jaws 37 and 38 respectively, which jaws are adapted to normally receive therebetween the forward edge of said work bench 36, and are further adapted to be fixedly secured thereon by a clamping screw 39, which screw is adapted to be threadably disposed within the lower jaw 38 and to engage the underside of the work bench 36, as shown in Fig. 3.

The adjustable magnifier 10 is adapted to be secured in operative position upon the saw clamp 12 by fixedly securing the base member 15 of said magnifier 10 to the upper side of the upper jaw 37 of said clamp 12 adjacent the outer end thereof, as by cap screws 40.

To expedite and facilitate the positioning or removing of the saw 11 within and from the saw clamp 12 the adjustable magnifier 10 may be swung backwardly and downwardly, as shown in dot and dash lines in Fig. 3, to thus leave said saw clamp entirely clear while performing said positioning or removing operation, as will be readily apparent.

However, if desired the magnifying glass or element 18 may be swung upwardly to a substantially vertical inoperative position, as shown in full lines in Fig. 4, to also permit of the proper positioning or removing of the saw 11 within and from the saw clamp 12, or for any other desired reason or purpose.

The magnifying glass 18 may also be adjusted in angular relation with respect to a horizontal plane or the normal plane of the teeth of the saw 41 to thereby permit of the proper and thorough inspection of the work during the filing operation.

In practice and after extensive use I have found that an adjustable magnifier for saw filing device fabricated in accordance with the features and principles of my invention to be productive of the desired and maximum results and to embody the maximum utility inasmuch as such a device is very convenient and simple to use, and is practically indispensable in work of the character for which it is designed.

It will be apparent by referring to the drawings and from the foregoing description that the length of the portion 20 of the member 16 will permit of considerable longitudinal adjustment of the magnifying element 18 without disturbing the saw 11 within its associated clamp 12, during the saw filing operation, and it will also be apparent that the member 17 will readily permit of the aligning or centralizing of the magnifying element 18 with respect to the teeth of the saw 11.

From the foregoing description taken in connection with the accompanying drawings, the advantages of the construction and of the method of operation of my adjustable magnifier will be readily apparent to those skilled in the art to which my invention pertains to thus enable those so skilled to construct and operate the same, but, while I have shown and described the construction and operation of an adjustable magnifier embodying my invention, which I now consider to be the best embodiment thereof, I desire to have it understood that the adjustable magnifier shown is merely illustrative and that such changes may be made when desired as are within the scope of my invention and embodied in the accompanying claim.

What I claim is:

A device of the class described comprising a base, clamping means mounted upon said base, a U shaped supporting member adapted to be clamped in a radial and longitudinal position within said base, a tubular T member having clamping means mounted thereon that is adapted to clamp said U shaped member for radial and longitudinal movement of said member, a straight member adapted to be clamped within said T member for lateral and radial movement, a magnifying element adjustably disposed for angular movement upon one end of said straight member, and clamping means for said magnifying element.

In witness whereof, I hereunto subscribe my name this 3rd day of October A. D. 1921.

CHARLES S. STONE.